Aug. 20, 1968   A. PILLERSDORF ET AL   3,398,007
BALLISTIC RECOVERY MEDIUM
Filed March 3, 1966
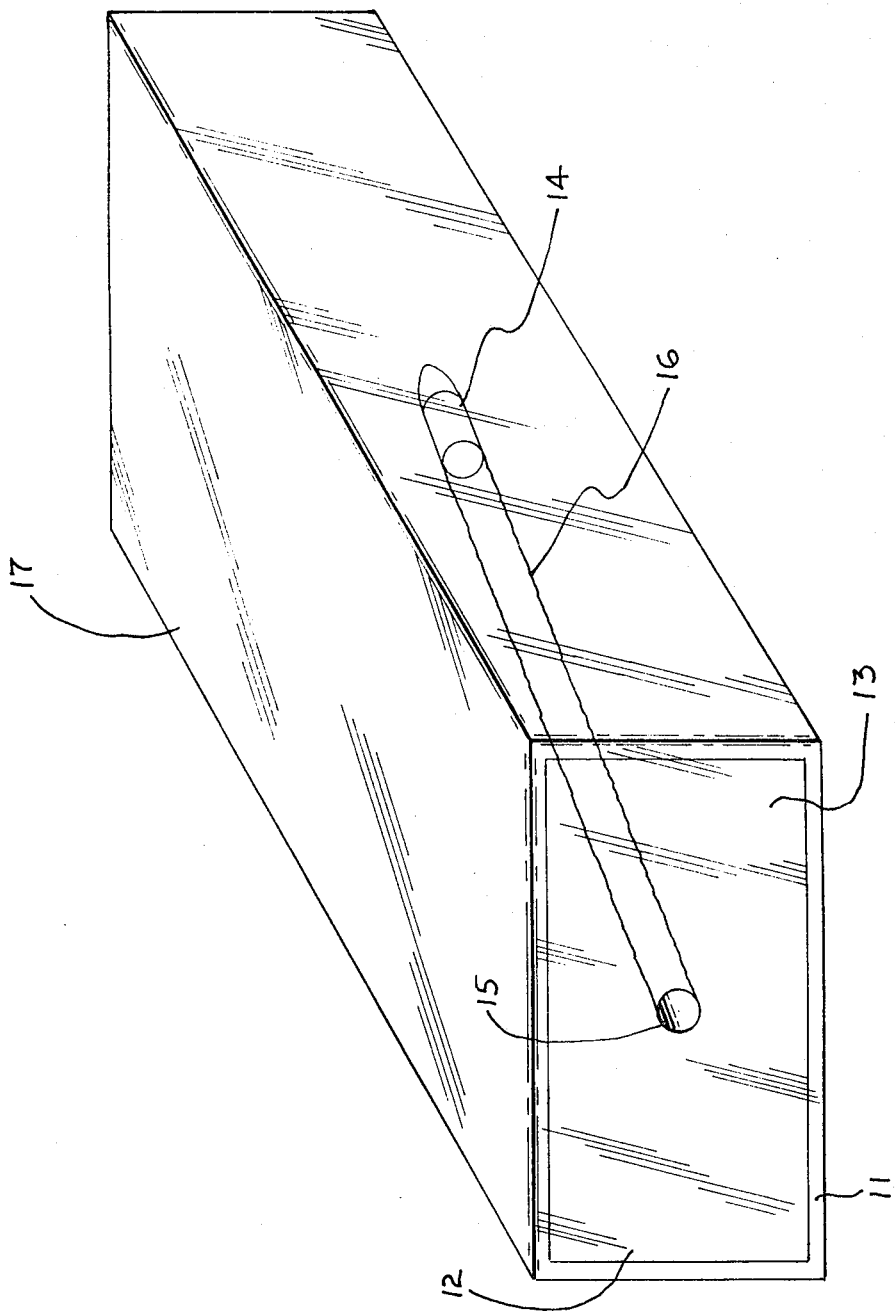
INVENTORS
ARTHUR PILLERSDORF
LESTER P. KUHN
ROGER-EDGAR BOWMAN
BY Harry M. Saragovitz,
Edward J. Kelly &
A.J. Dupont   ATTORNEYS 3,398,007
BALLISTIC RECOVERY MEDIUM
Arthur Pillersdorf, Lester P. Kuhn, and Roger-Edgar Bowman, Aberdeen, Md., assignors to the United States of America as represented by the Secretary of the Army
Filed Mar. 3, 1966, Ser. No. 533,376
3 Claims. (Cl. 106—128)

ABSTRACT OF THE DISCLOSURE

A ballistic recovery medium and process for the preparation thereof consisting of:

| Ingredients: | Percent by weight |
|---|---|
| Glycerin | 73–78 |
| Gelatin | 10–15 |
| Water | about 10 |
| Methyl cellulose | about 2 |

This invention relates to an improved ballistic recovery medium formed of a gelatin composition. More particularly, the invention pertains to a gelatin mass which is useful as a ballistic recovery medium, bullet trap, or as a means for tracing the course prescribed by a fired projectile.

Various means were employed in the past for confining and recovering bullets fired for test purposes. Sand, wood chips, sawdust, hay, water and other compressible media have served at times to decelerate and dissipate the energy of fired bullets and to reclaim them without great effort or damage. More recently, a gelatin mass was found particularly more advantageous because not only does a fired bullet come to rest therein and recovered without effort or damage, but its course of flight is readily discernible and its flight pattern may be traced in gelatin long after the actual firing. Although gelatin is an ideal, soft trapping and recovery medium, its previous use was handicapped by the fact that gelatin compositions undergo deterioration and putrefaction with the formation of foul-smelling products. Even under controlled conditions or cold storage, a gelatin mass would experience considerable dehydration resulting in wide variations in its overall dimensions and density. In view of its decay and dimensional instability, gelatin did not lend itself to any extensive studies nor to precise measurements. Equally important was the cost factor, since previous gelatin compositions could not be preserved for long periods nor reclaimed and recast into reusable ballistic recovery media.

An object of the present invention is to provide an improved stiff jelly composition which can be utilized more effectively for trapping and recovering fired projectiles.

Another object of this invention is to provide a more stable gelatin composition which is capable of retaining its physical properties for prolonged periods at room temperature and which is capable of resisting deterioration or bacterial decay.

A further object of the invention is to provide a novel ballistic recovery medium that enables ready identification of the fired bullet as well as the path inscribed therein.

In accordance with the foregoing objects, this invention broadly comprises a mixture of glycerin and gelatin, with little or no water added thereto, to form a heat-reversible gelatinous mass or jelly having excellent preserving properties. The water component may be added to the mixture in amounts up to about 10 percent by weight of the final composition. The gelatin composition is formed with large amounts of glycerin in contrast to the aqueous mixtures of the prior art in which glycerin was added as a plasticizer. The present gelatin gels are formed with mixtures containing glycerin in amounts of about 70–97 percent by weight, and the gelatin is included in amounts of about 3–20 percent by weight. The present mixture forms more stable gels which are substantially more resistant to exudation and bacterial decay. Preferred compositions in accordance with the invention consist essentially of about 75 to 90 percent glycerin, about 10 to 15 percent gelatin and about 10 percent water by weight. Inclusion of water provides greater ease of preparation and lower viscosities in the fluid that aids in the removal of air bubbles upon standing. When the mixture cools to room temperature it becomes a flexible, homogeneous mass possessing considerable transparency.

The composition may be cast into unsupported sections or slabs to be used as targets or recovery media in ballistic testing. The composition may be poured into suitable containers and allowed to cool therein to provide wall support for the gelatin target.

A ballistic recovery structure which may include the present gelatin composition is illustrated in the accompanying drawing in which a container 11 of any convenient shape has an open end 13. The container is formed preferably of a clear plastic for visual detection therein. The container is filled with a gelatin mass 12 formed in accordance with the present invention. The open end 13 provides a target surface on which a fired bullet 14 produces a hole 15 as it passes into the mass along a path 16 (shown obliquely therein for convenience in illustration).

The present composition has been found to be substantially more stable experiencing only minor losses of water, as shown further on in the specification. The gelled composition may be kept at room temperature for several months without deterioration or bacterial decay. The composition may be utilized as a ballistic recovery medium and then heated to melting and recast into a reusable recovery medium.

The composition is readily formed by mixing and heating the gelatin to form a homogeneous solution which is then cleared of air bubbles by slow cooling or degassed under vacuum. The following examples will serve to illusrtate the manner in which the present recovery medium is prepared.

EXAMPLE I

An 80% glycerin, 10% gelatin and 10% water gel is prepared by mixing glycerin and water to a temperature of about 60–80° C. and adding granulated gelatin slowly with stirring until it has dissolved and a homogeneous solution is obtained. The stirring is then stopped and a partial vacuum of about 50–100 mm. Hg is applied to remove air bubbles. After the solution has cleared, it is then poured into a mold and allowed to cool to a gel.

It was found that raising the temperature of the glycerin solution to about 70° C. and then adding the gelatin slowly with thorough stirring results in a better product. Rapid stirring improves the wetting of the gelatin granules without clumping. Optimum results in the gel are also noted when the solution time of the composition is made as short as possible. For example, after addition of the gelatin, the temperature of the solution may be raised to 80° C., and the solution is then poured into the mold. The higher temperature allows for a more fluid solution which may be degassed more expediently by slow cooling in the mold.

For a lower response to ambient humidity, the present composition may include therein a small amount of methyl cellulose up to about 2% of the final mixture. The gel composition containing methyl cellulose shows further improvement in its ability to resist water losses.

EXAMPLE II

A mixture of 50 grams water and 10 grams methyl cellulose U.S.P. grade 400 cps. viscosity, was stirred until a clear solution was obtained. A 400 gram quantity of glycerin was then added, and the solution was heated to 70° C. A 50 gram quantity of granulated gelatin was then added slowly with thorough stirring until the gelatin had dissolved. The temperature of the fluid mixture was then raised to 80° C. and held until the solution had cleared. The resulting solution was then poured into a rectangular mold and allowed to cool and gel.

The above gelatin composition demonstrated a minimum change in properties even after prolonged storage of several months at room temperature. Careful control of temperature and humidity was not required for the preservation of the gelatin. The gelatin composition was then weighed to determine weight losses. Finally, the gelatin composition was heated to about 60° C. to form a clear solution, and it was poured into a mold. The regelled composition was very suitable for use as a recovery medium.

The following table demonstrates the more stable nature of the present gelatin compositions, based on weight loss (Examples A thru D) as contrasted with other gelatin compositions (Examples E thru H) which experience large losses of weight. The weight loss reported was obtained from samples which were allowed to stand at room temperature for several weeks.

WEIGHT LOSS DETERMINATION

| Sample | Glycerin, wt. percent | Gelatin, wt. percent | Water, wt. percent | Methyl Cellulose, wt. percent | Weight Loss, wt. percent |
|---|---|---|---|---|---|
| A | 80 | 10 | 10 | 0 | 3.. |
| B | 78 | 10 | 10 | 2 | 0.8 |
| C | 75 | 15 | 10 | 0 | 2.8 |
| D | 73 | 15 | 10 | 2 | 0.8 |
| E | 60 | 30 | 10 | 0 | 6.5 |
| F | 58 | 30 | 10 | 2 | 6.3 |
| G | 45 | 45 | 10 | 0 | 15.6 |
| H | 43 | 45 | 10 | 2 | 14.5 |

The above tests indicate the improved stability of the present gelatin compositions, Examples A thru D, prepared with large amounts of glycerin, of about 8:1 to about 5:1 ratios of glycerin to gelatin, respectively, and containing about 10% water. The weight loss of these samples were much less than in Examples E thru H prepared with lesser amounts of glycerin based on the gelatin present therein. Also, the inclusion of methyl cellulose is shown to be capable of counteracting the tendency of gelatin to lose water. This improvement is achieved however, at the expense of transparency in the final composition.

The testing of various firearms by firing projectiles into the present gelatin mass is of considerable importance because the fired projectile and its prescribed course are preserved in a more stable composition that can be used for detailed or thorough studies long after the actual firing. In addition, the embedded projectile or other article is protected from the action of air and other impurities and the present gelatin mass may be used as a protective environment for any embedded article therein.

It will be apparent to those skilled in the art that the present gelatin composition offers considerable improvement over aqueous gelatin compositions and other gels which deteriorate and undergo a continuous change in properties. The present composition provides a simple, safe and inexpensive medium for trapping and confining a fired projectile with a relatively permanent path and pattern available within said medium.

Obviously many modifications and variations of the present invention are possible in the light of the above teachings. It is therefore to be understood that within the scope of the appended claims the invention may be practiced otherwise than as specifically described.

What we claim as new and desire to secure by Letters Patent of the United States is:

1. A ballistic recovery medium consisting of:

| Ingredients: | Percent by weight |
|---|---|
| Glycerin | 73–78 |
| Gelatin | 10–15 |
| Water | about 10 |
| Methyl cellulose | about 2 |

2. A ballistic recovery medium in accordance with claim 1, including a transparent container therefor.

3. A ballistic recovery medium consisting of:

| Ingredients: | Percent by weight |
|---|---|
| Glycerin | 78 |
| Gelatin | 10 |
| Water | 10 |
| Methyl cellulose | 2 |

References Cited

UNITED STATES PATENTS

| 2,426,935 | 9/1947 | Kramsky et al. | 106—136 |
| 2,616,812 | 11/1952 | Kramsky et al. | 106—136 |
| 2,704,269 | 3/1955 | Tice | 106—136 |

JAMES A. SEIDLECK, *Primary Examiner.*

T. MORRIS, *Assistant Examiner.*